United States Patent
Park

[11] Patent Number: 5,999,233
[45] Date of Patent: Dec. 7, 1999

[54] APPARATUS FOR REDUCING A VIBRATION OF A TELEVISION SET

[75] Inventor: Sang-Deuck Park, Seoul, Rep. of Korea

[73] Assignee: Daewoo Electronics Co., Ltd., Seoul, Rep. of Korea

[21] Appl. No.: 09/131,738

[22] Filed: Aug. 10, 1998

[30] Foreign Application Priority Data

Apr. 30, 1998 [KR] Rep. of Korea ............ 98-15650
Apr. 30, 1998 [KR] Rep. of Korea ............ 98-15651
Apr. 30, 1998 [KR] Rep. of Korea ............ 98-15652

[51] Int. Cl.$^6$ .............................. H04N 5/64; A47B 81/06
[52] U.S. Cl. ............................................. 348/836; 312/7.2
[58] Field of Search ................................... 348/825, 836; 312/7.2, 223.1, 223.2; 248/371, 917, 918, 919, 920, 921, 922, 923; 361/681, 682, 683, 756, 796

[56] References Cited

U.S. PATENT DOCUMENTS

| | | | |
|---|---|---|---|
| 3,104,282 | 9/1963 | Horn et al. | 361/682 X |
| 3,703,323 | 11/1972 | Gallas et al. | 312/7.2 |
| 4,873,578 | 10/1989 | Tognoni et al. | 348/836 |
| 5,033,802 | 7/1991 | Fairbanks | 312/7.2 |
| 5,041,944 | 8/1991 | Campisi | 361/682 |
| 5,067,022 | 11/1991 | Huerre et al. | 348/836 X |
| 5,363,150 | 11/1994 | Kojima | 312/7.2 X |
| 5,575,545 | 11/1996 | Wang | 312/7.2 |
| 5,583,582 | 12/1996 | Higuchi et al. | 348/836 |
| 5,583,743 | 12/1996 | Levins et al. | 312/223.2 X |
| 5,863,106 | 1/1999 | Beak | 312/7.2 |

FOREIGN PATENT DOCUMENTS 851612 9/1970 Canada ................ 312/7.2

*Primary Examiner*—Peter R. Brown
*Assistant Examiner*—James O. Hansen
*Attorney, Agent, or Firm*—Pillsbury Madison & Sutro LLP

[57] ABSTRACT

Apparatus for reducing a vibration of a television set which reduces a vibration and an interference between various components installed therein. The apparatus has a mounting plate forming a bottom part of the front casing and on which a couple of rails for installing a PCB are mounted, and a resonance frequency converting section for setting a resonance frequency of the television set to a relatively high frequency. The resonance frequency converting section has a reinforcement strip provided along an underside circumferential portion of the mounting plate, a rib group having a cross-shaped pattern which is provided at the underside of the mounting plate in such a manner that the rib group is surrounded by the reinforcement strip, and a couple of support brackets provided in the rib group. By installing the apparatus, the television set has a high frequency resonance so that the vibration is reduced, thereby reducing a noise and the interference thereof.

15 Claims, 16 Drawing Sheets

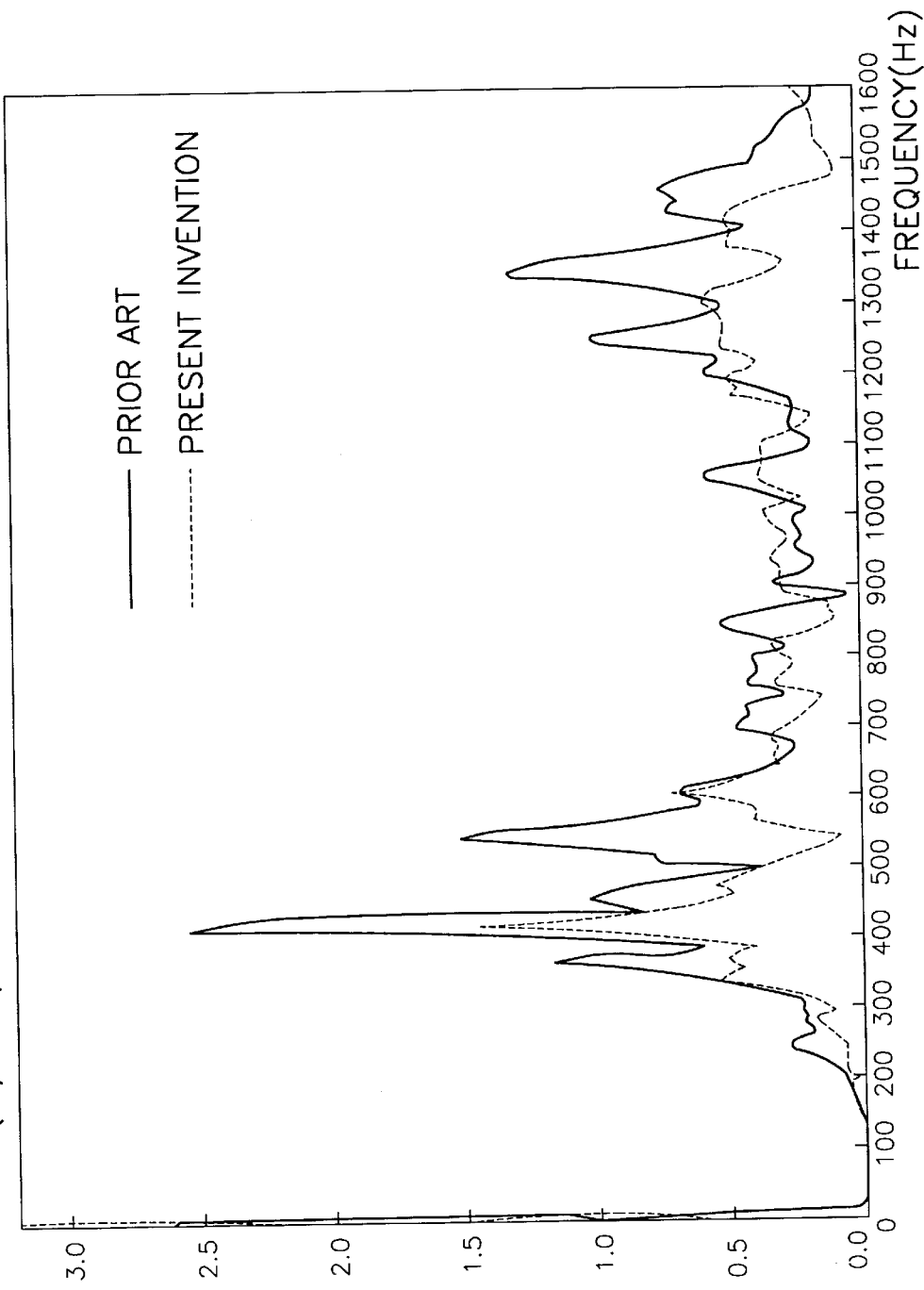

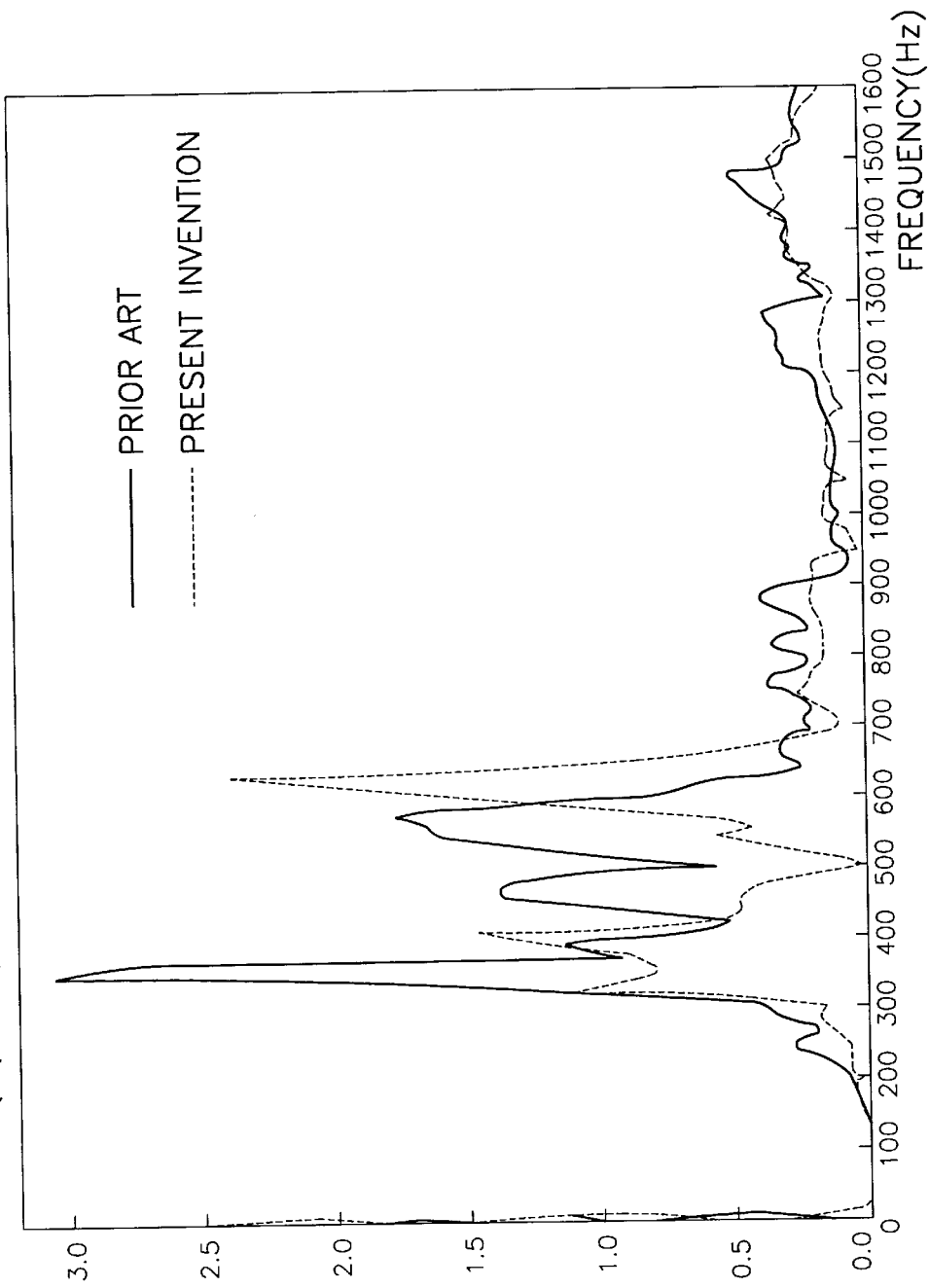

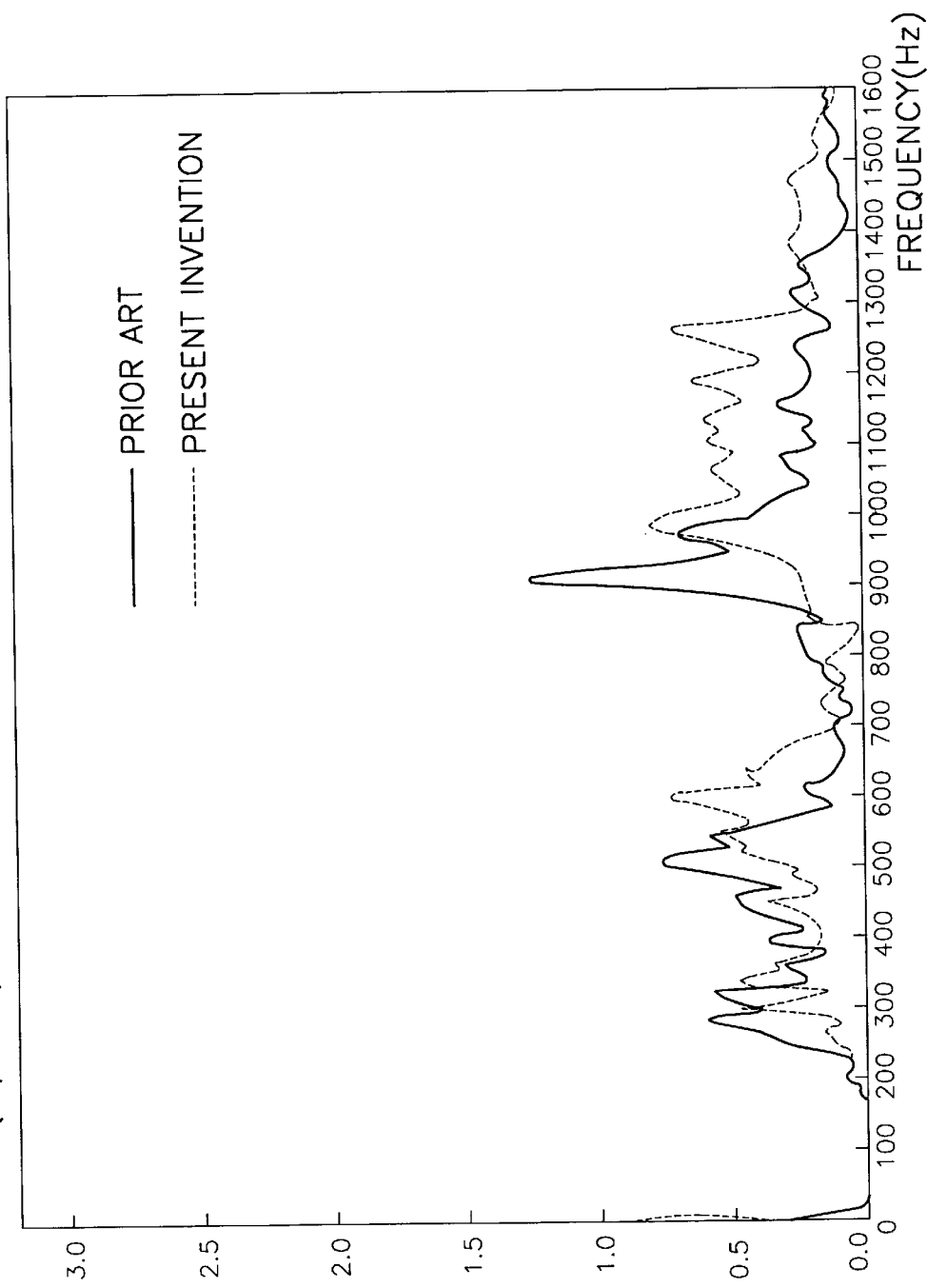

APPARATUS FOR REDUCING A VIBRATION OF A TELEVISION SET

BACKGROUND OF THE INVENTION

1. Field of the Invention

The present invention relates to a television set, and more particularly to an apparatus for reducing a vibration of a television set which can reduce a vibration and an interference produced by a low frequency resonance between a speaker and a casing holding the speaker therein.

2. Description of the Prior Art

Generally, a speaker of a television set is an apparatus for transforming an electric signal to an audio signal and includes a magnetic circuit, a voice coil, and a vibration system.

FIG. 1 is a partial sectional view of a television set including a speaker 5. Referring to FIG. 1, a diaphragm 4 for generating a sound pressure is attached to speaker 5. A front casing 1 is formed at a predetermined position thereof with a duct 3 for guiding a sound reproduced by speaker 5 to the outside thereof. Speaker 5 is secured to one end of duct 3, and a speaker grill 2 is installed at the other end of duct 3. Reference number 6 indicates buttons for selecting operation modes of the television. In general, speaker 5 has a capacity of 3 Watts.

FIG. 2 is a perspective view of front casing 1. Referring to FIG. 2, a couple of rails 14 for mounting a PCB (not shown) are installed at a bottom plate 12 of front casing 1. Front casing 1 is formed at a front portion thereof with a plurality of thruholes 9 for inserting buttons 6.

FIGS. 9 and 10 shows an acceleration and a displacement of speaker 5 secured to front casing 1 in response to a frequency. As shown in these graphs, the speaker has a resonance frequency of 168 Hz in which the speaker resonates with a maximum amplitude. Also, in FIG. 11, a sound pressure level detected from outside of the television set including speaker 5 in response to a frequency is represented by a continuous line.

As shown in FIG. 11, the television set represents a maximum sound pressure level at 216 Hz, and accordingly, the resonance frequency of the set is 216 Hz.

However, this low frequency resonance generates a relatively high vibration, so an interference in the sound and the image is frequently produced. So, the sound pressure generated from the television set at 216 Hz is caused mainly by the vibration of the television set itself.

The vibration is transmitted along front casing 1 so as to vibrate a couple of rails 14, buttons 9, and various components installed in the television set. This vibration may disturb a viewer.

Also, since the PCB mounted at the couple of rails 14 vibrates, in some cases, the coil at the PCB may by disconnected. Furthermore, due to the vibration of buttons 9, an interference in the image of a monitor or a change in the operation mode of the television set is produced.

SUMMARY OF THE INVENTION

The present invention is intended to overcome the above-described disadvantages. Therefore, it is an object of the present invention to provide an apparatus for reducing a vibration of a television set which increases a resonance frequency of the television set so that the television set does not resonate within a low frequency band, thereby reducing the vibration of the television set.

In order to achieve the above object of the present invention, there is provided an apparatus for reducing a vibration of a television set having a front casing and a speaker installed at a predetermined position of the front casing, the apparatus comprising:

a mounting plate forming a bottom part of the front casing and mounting a couple of rails on which a PCB is mounted;

a first means for reducing a vibration of the television set by setting a resonance frequency of the television set to a relatively high frequency, the first means being attached to the television set.

According to a preferred embodiment of the present invention, the first means includes a reinforcement strip provided along a circumferential portion of an underside of the mounting plate, a rib group having a cross-shaped pattern which is provided at the underside of the mounting plate in such a manner that the rib group is surrounded by the reinforcement strip, and a couple of support brackets provided in the rib group. The reinforcement strip and the rib group are spaced apart from each other at a predetermined interval.

The apparatus further comprises a second means for preventing the television set from vibrating in a forward or a backward direction. The second means includes a ridge transversely installed over a full width of a rear underside of the front casing.

By installing the apparatus for reducing a vibration in accordance with the present invention, the television set has a resonance frequency in a high frequency band so that the vibration is reduced, thereby reducing a noise and an interference thereof.

Also, the apparatus for reducing a vibration in accordance with the present invention can effectively compensate vibrations in X, Y, Z directions, thereby giving a reasonable sound quality.

BRIEF DESCRIPTION OF THE DRAWINGS

The above object and other advantages of the present invention will become more apparent by describing in detail a preferred embodiment thereof with reference to the attached drawings in which:

FIG. 18 is a graph for comparing the acceleration at a first position of the front casing of the conventional television set and the acceleration at a first position of the front casing having the apparatus for reducing a vibration in accordance with the third embodiment of the present invention in response to the frequency;

FIG. 19 is a graph for comparing the acceleration at a second position of the front casing of the conventional television set and the acceleration at a second position of the front casing having the apparatus for reducing a vibration in accordance with the third embodiment of the present invention in response to the frequency; and FIG. 20 is a graph for comparing the acceleration at a third position of the front casing of the conventional television set and the acceleration at a third position of the front casing having the apparatus for reducing a vibration in accordance with the third embodiment of the present invention in response to the frequency.

DETAILED DESCRIPTION OF THE INVENTION

Hereinafter, preferred embodiments of the present invention will be explained in more detail with reference to the accompanying drawings. The same numerals are given to the identical components as conventional components.

Figure 1:
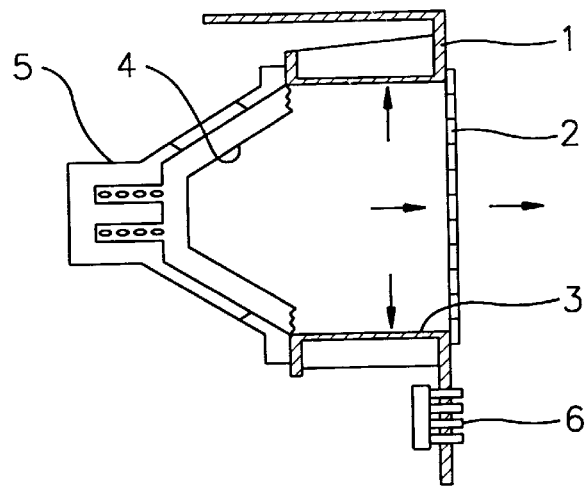
FIG. 1 is a partial sectional view showing the assembled state of a conventional speaker with a front casing.
Figure 2:
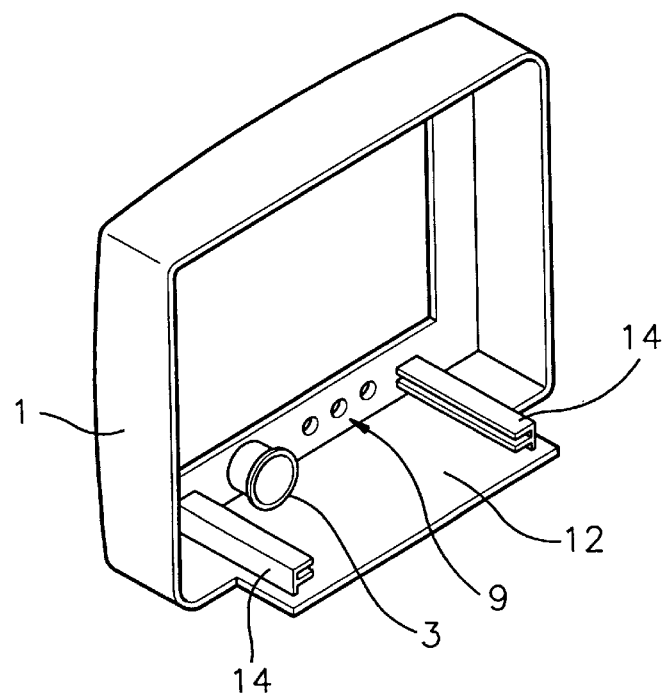
FIG. 2 is a perspective view of the conventional front casing.
Figure 3:
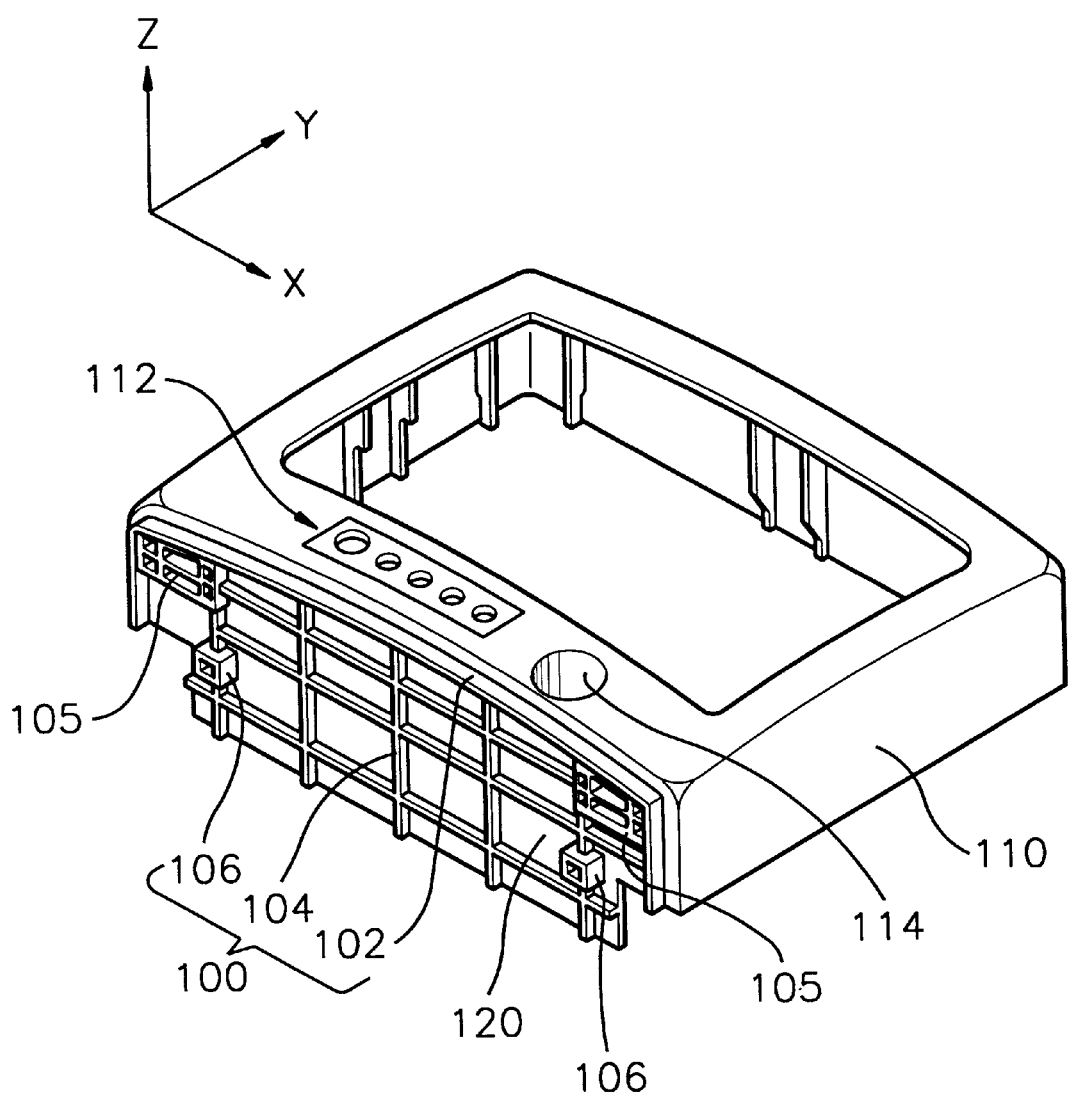
FIG. 3 is a perspective view of a front casing having an apparatus for reducing a vibration of a television set in accordance with a first embodiment of the present invention.

As shown in FIG. 3 by arrows, an X direction means a width direction of a television set, a Y direction means a vertical direction of the television set, and a Z direction means a forward or a backward direction of the television set.

FIG. 3 is a perspective view of a front casing 100 of a television set having an apparatus for reducing a vibration 100 in accordance with a first embodiment of the present invention. Front casing 110 is formed at a lower portion thereof with a duct 114 for guiding a sound reproduced by speaker 130 (shown in FIG. 4) to the outside thereof, and is formed with a plurality of holes for inserting various buttons for selecting operation modes of the television set. In general, speaker 130 has a capacity of 3 Watts.

The apparatus for reducing a vibration 100 is provided so as to reinforce parts of the television set at which vibrations are frequently produced. Accordingly, the apparatus for reducing a vibration 100 is installed at an underside of a mounting plate 120 forming a bottom part of the front casing 110 so that the apparatus 100 reduces a vibration of the television set by raising a resonance frequency of the television set to a relatively high frequency.

Figure 4:
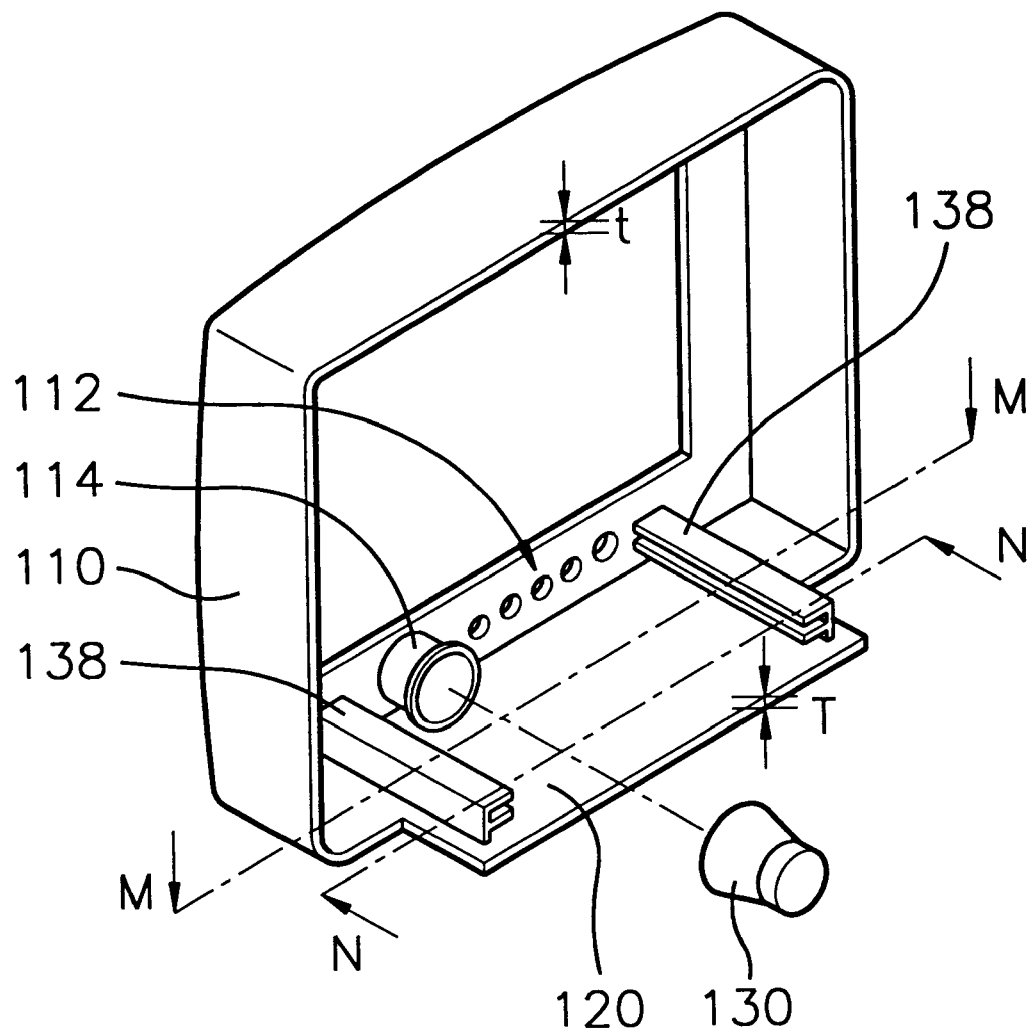
FIG. 4 is a perspective view of a rear surface of the front casing shown in FIG. 3.

Referring to FIG. 4, a couple of rails 138 for mounting a PCB (not shown) is installed on mounting plate 120. The rails 138 have F-shaped cross-sections and extend over a full width of mounting plate 120. Also, to attenuate a vibration produced at mounting plate 120, a thickness T of the mounting plate 120 is defined by a following equation.

T=t+(t×0.2~0.5) mm, wherein t is a thickness of the front casing.

If the thickness T of mounting plate 120 is below the range evaluated by the above equation, the vibration is intensely produced, on the other hand, if the thickness T of mounting plate 120 is above the range, the thickness T of mounting plate 120 comes to be very thick, so it may be difficult to produce and install mounting plate 120. In this embodiment, the thickness t of the front casing 110 is in a range of 2.5 to 2.7 mm and the thickness T of the mounting plate 120 is in a range of 3.3 to 3.7 mm.

Referring again to FIG. 3, the apparatus for reducing a vibration 100 includes a reinforcement strip 102 provided along a circumferential portion of an underside of the mounting plate 120, a rib group 104 having a cross-shaped pattern which is provided at the underside of the mounting plate 120 in such a manner that the rib group 104 is surrounded by the reinforcement strip 102, and a couple of support brackets 106 provided in the rib group 104.

Reinforcement strip 102, rib group 104 having a cross-shaped pattern, and support brackets 106 have a function of attenuating a vibration of mounting plate 120 in the Y direction.

According to a preferred embodiment of the present invention, the reinforcement strip 102 and the rib group 104 are spaced apart from each other by a predetermined interval. This is for preventing a vibration in a Y direction applied to mounting plate 120 from being transmitted to buttons through rib group 104 and reinforcement strip 102. According to a preferred embodiment of the present invention, the reinforcement strip 102 and the rib group 104 are spaced apart from each other by approximately 3 mm.

When the television set is placed at a bottom, the support brackets 106 make contact with the bottom together with a couple of leg parts 105 installed in a front underside portion of mounting plate 120 so as to support the television set. Preferably, the support brackets 106 have rectangular shapes so as to stably make contact with the bottom. At this time, support strip 102 does not make contact with the bottom.

Figure 5:
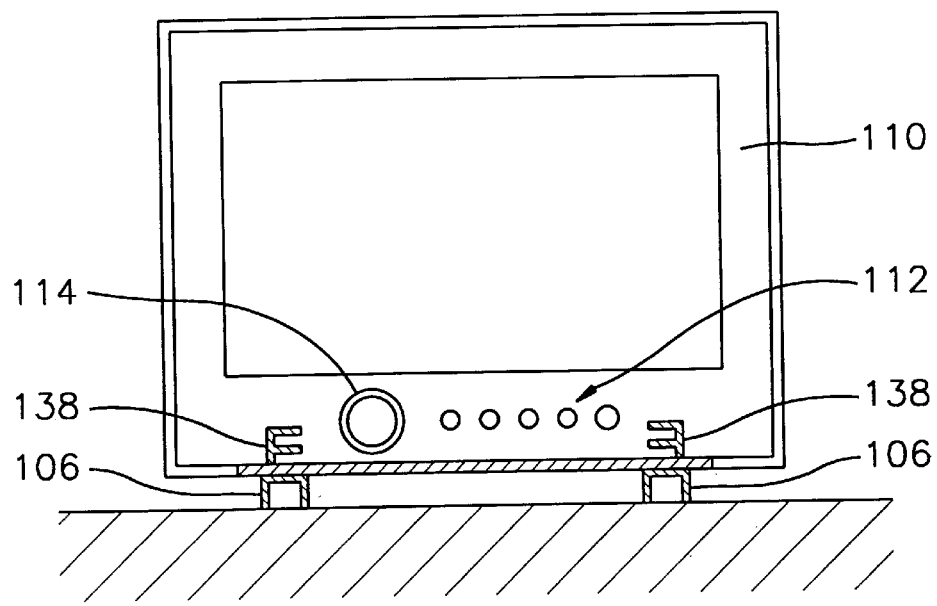
FIG. 5 is a sectional view taken along the line N—N shown in FIG. 4.
Figure 6:
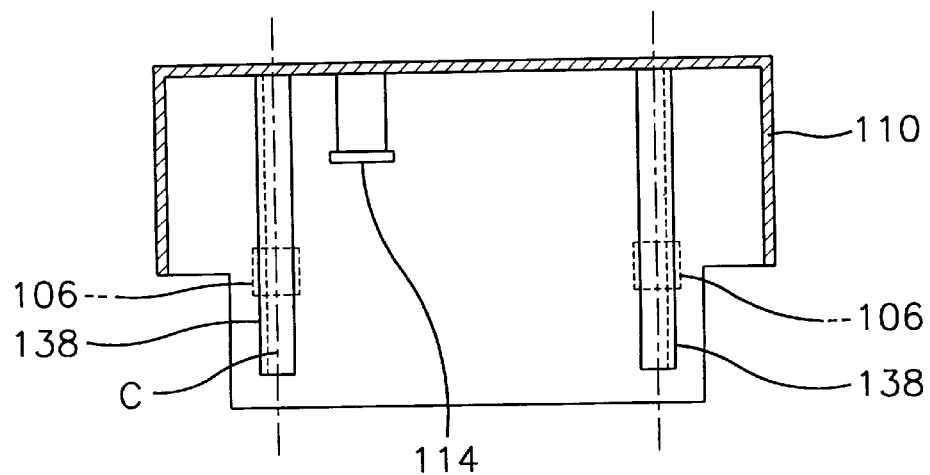
FIG. 6 is a sectional view taken along the line M—M shown in FIG. 4.

As shown in FIG. 5, the couple of support brackets 106 are installed at predetermined positions of an underside of the mounting plate corresponding to the couple of rails 138 for reducing a vibration produced at the couple of rails 138. Also, as shown in FIG. 6, when viewed from a top, each longitudinal axis of each support bracket 106 is identical to each longitudinal axis of each rail 138. Meanwhile, since the vibration is mainly produced at a rear portions of rail 138, it is proper to install each support bracket 106 at a position adjacent to a rear portion of the corresponding rail 138.

Figure 11:
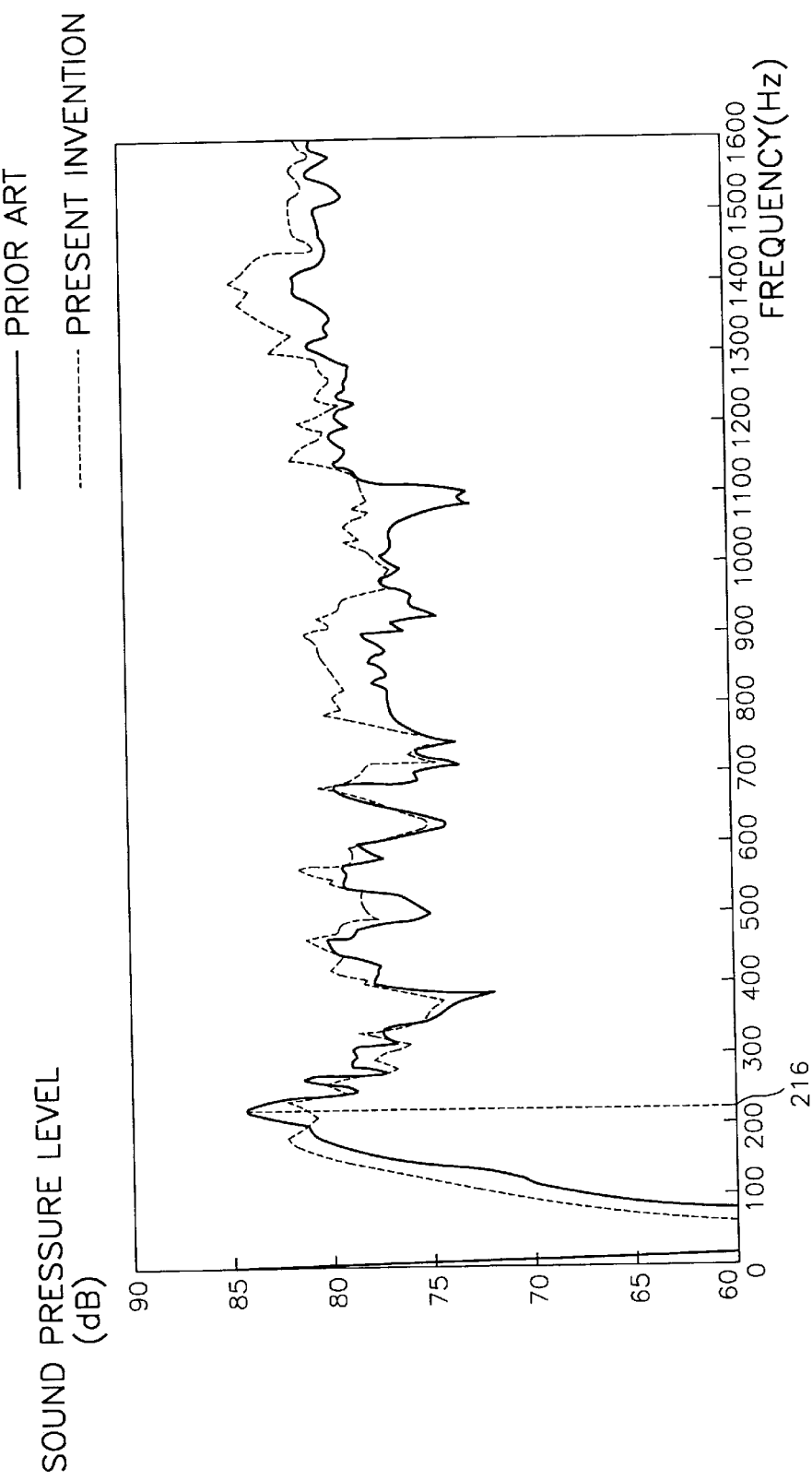
FIG. 11 is a graph showing sound pressure levels of the conventional television set and the television set having the apparatus for reducing a vibration in accordance with a first embodiment of the present invention in response to the frequency.
Figure 12:
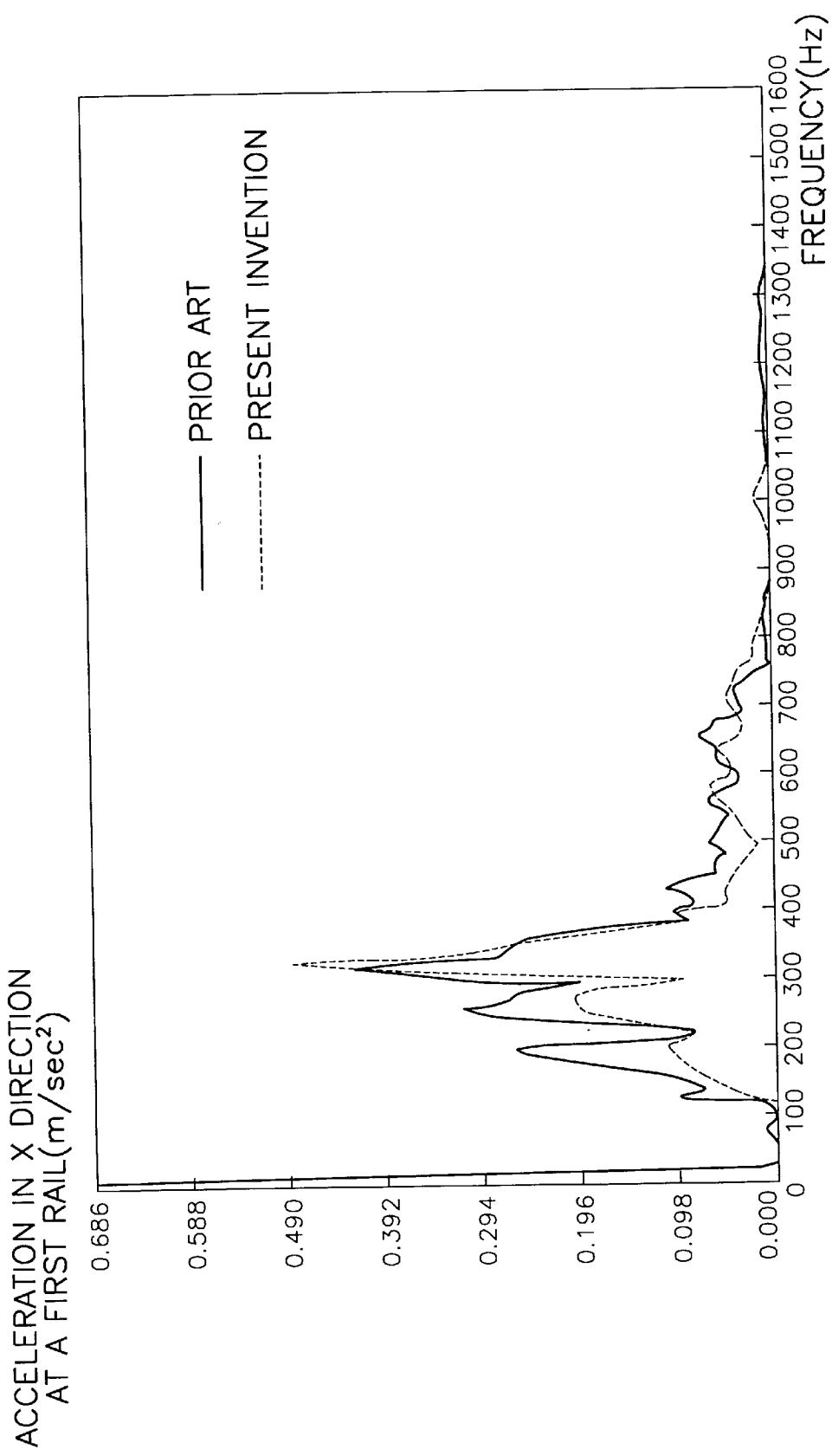
FIG. 12 is a graph for comparing the acceleration in an X direction of a first rail of the conventional television set and the acceleration in the X direction of a first rail of the television set having the apparatus for reducing a vibration in accordance with the second embodiment of the present invention in response to the frequency.
Figure 13:
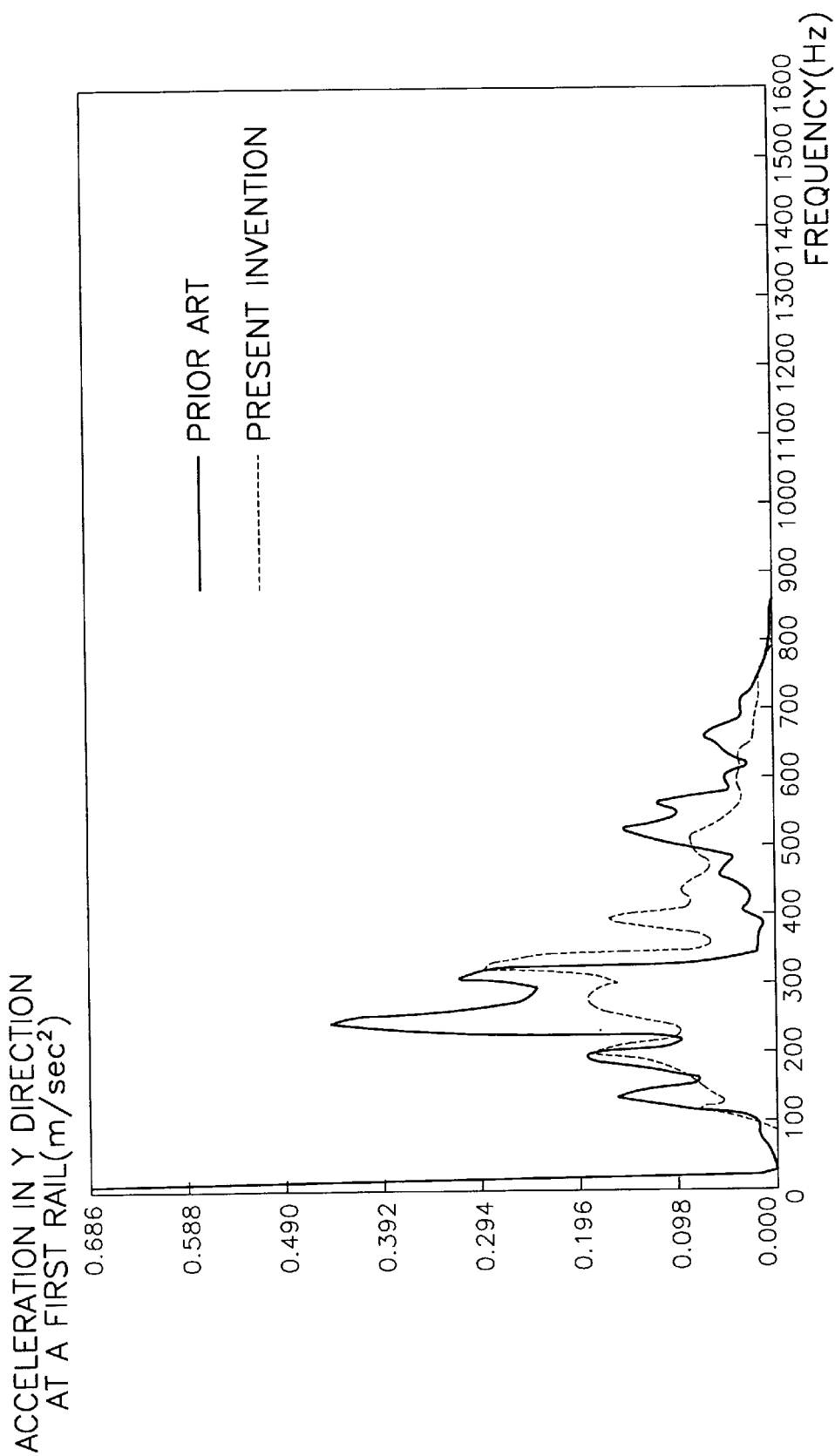
FIG. 13 is a graph for comparing the acceleration in a Y direction of the first rail of the conventional television set and the acceleration in the Y direction of the first rail of the television set having the apparatus for reducing a vibration in accordance with the second embodiment of the present invention in response to the frequency.
Figure 14:
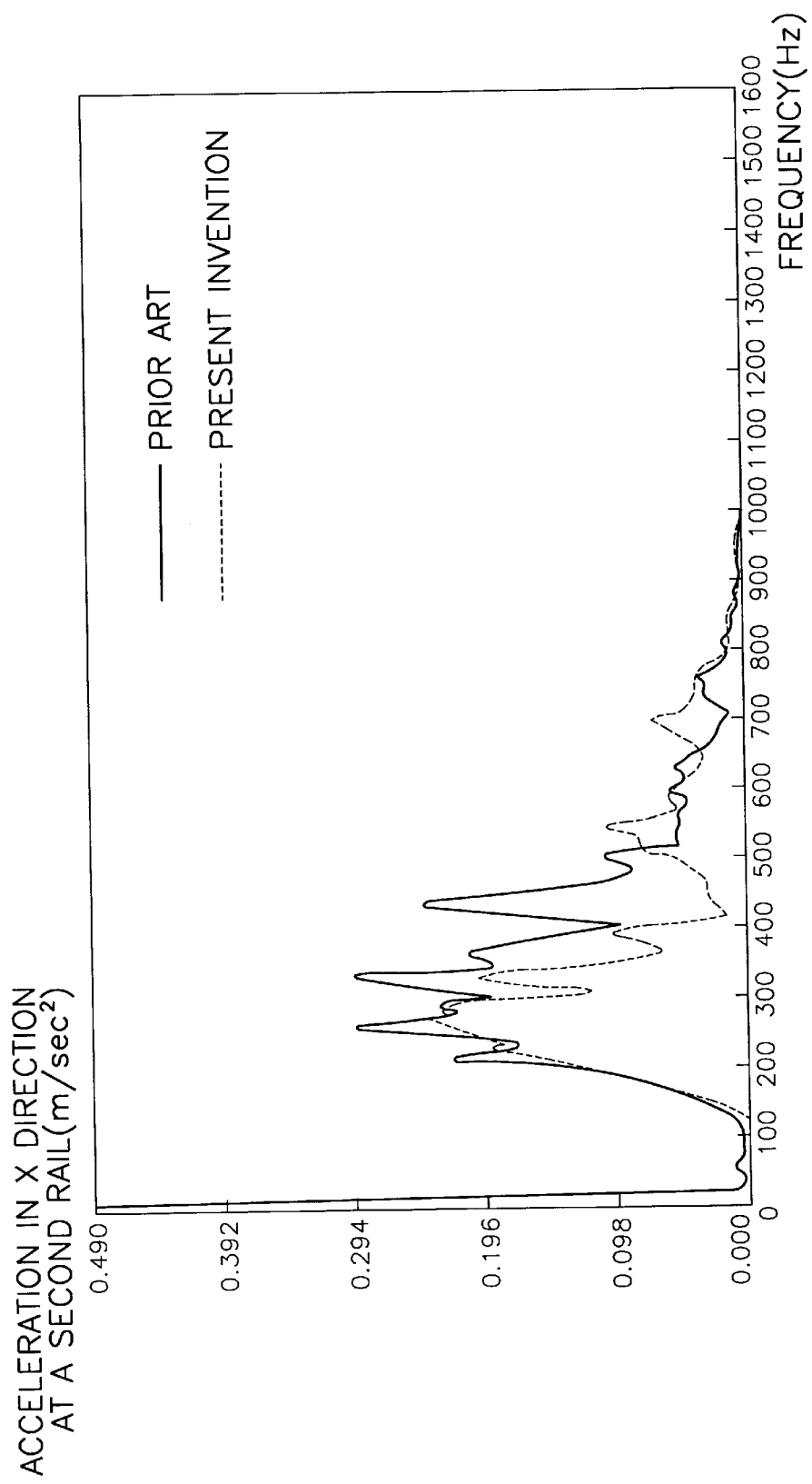
FIG. 14 is a graph for comparing the acceleration in the X direction of a second rail of the conventional television set and the acceleration in the X direction of a second rail of the television set having the apparatus for reducing a vibration in accordance with the second embodiment of the present invention in response to the frequency.
Figure 15:
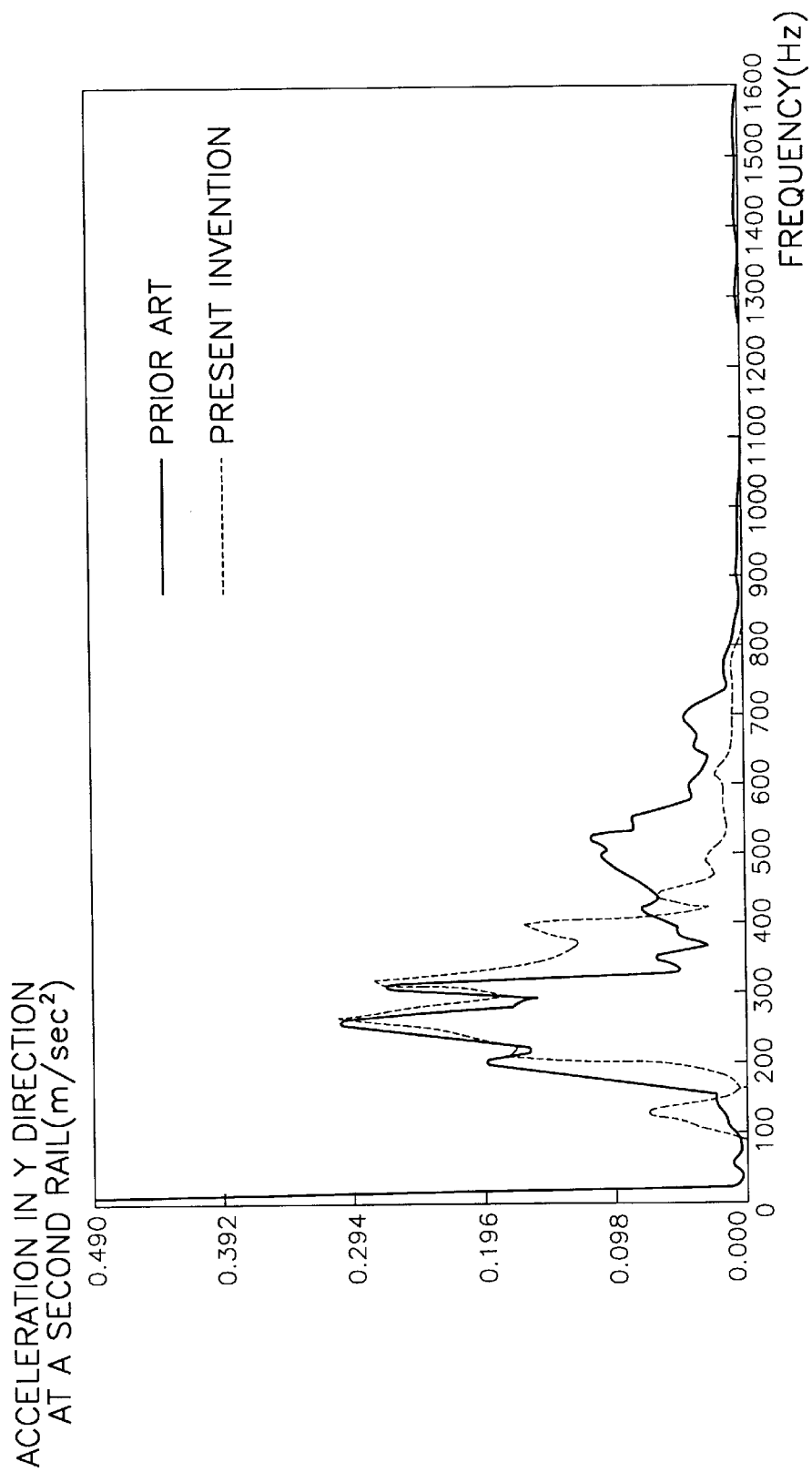
FIG. 15 is a graph for comparing the acceleration in the Y direction of the second rail of the conventional television set and the acceleration in the Y direction of the second rail of the television set having the apparatus for reducing a vibration in accordance with the second embodiment of the present invention in response to the frequency.

FIG. 11 is a graph showing sound pressure levels of the conventional television set (continuous line) and the television set having the apparatus for reducing a vibration 100 in accordance with a first embodiment of the present invention in response to the frequency. An experiment is carried out by the inventor of this application in which the speaker installed in the television is vibrated by a sound sweeper and a microphone and a FFT (Fast Fourier Transformer) are installed in front of the television set with 30 cm intervals therebetween so as to measure the frequency.

Referring to FIG. 11, the television set having the apparatus for reducing a vibration 100 in accordance with a first embodiment of the present invention has a resonance frequency within a relatively high frequency band, and generates a sound pressure level in a frequency range of 200 to 300 Hz which is lower than that of the conventional television set. Since the television set has a high resonance frequency, the displacement thereof decreases, thereby reducing the vibration and the noise.

Figure 7:
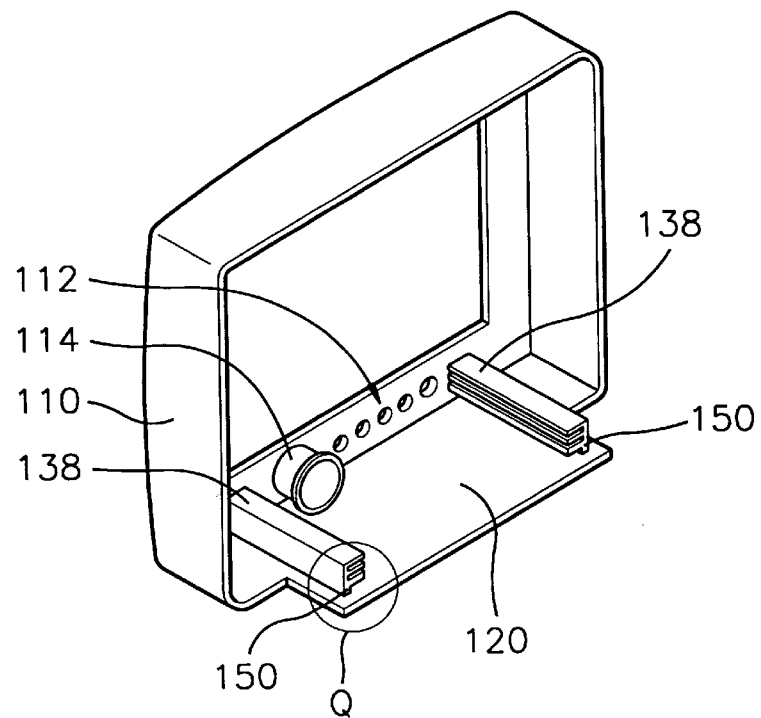
FIG. 7 is a perspective view of a front casing having an apparatus for reducing a vibration of a television set in accordance with a second embodiment of the present invention.
Figure 8:
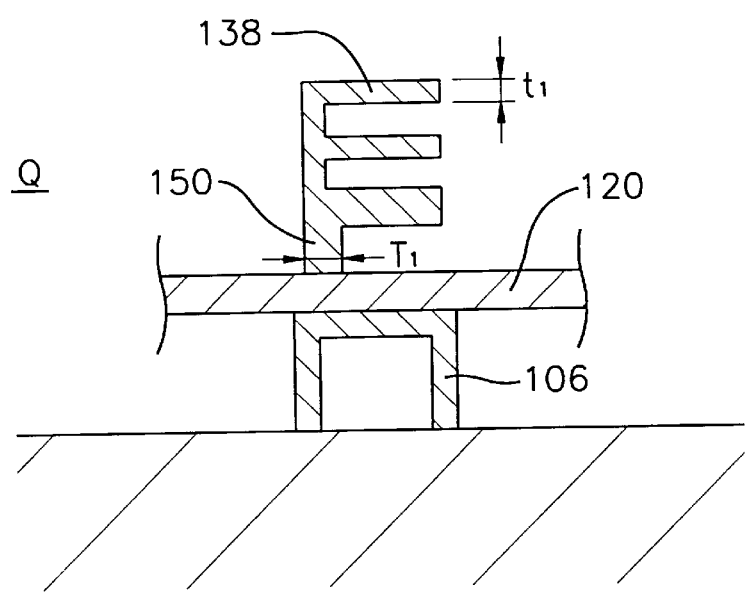
FIG. 8 is an enlarged view of a "Q" portion shown in FIG. 7.
Figure 9:
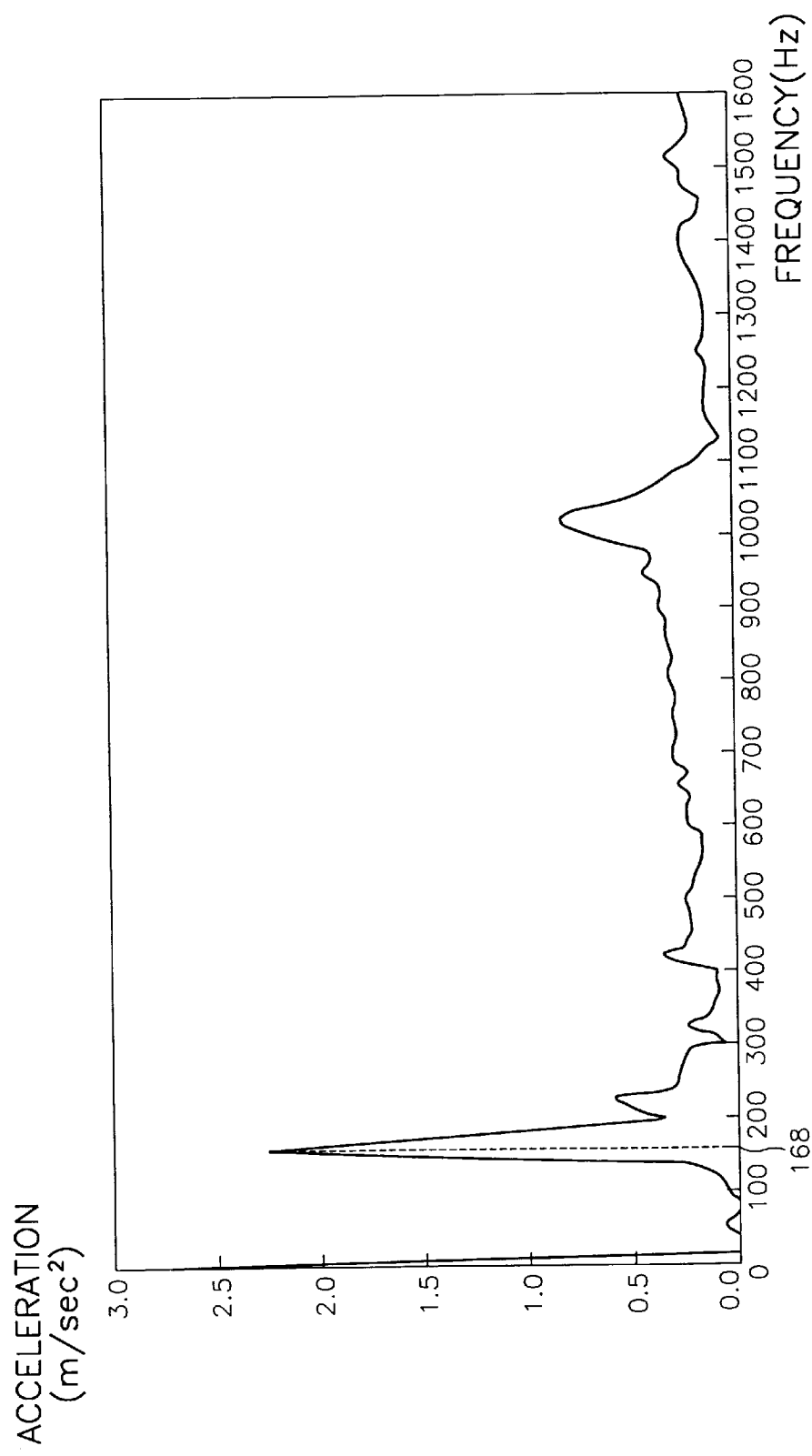
FIG. 9 is a graph showing an acceleration of the speaker mounted at the front casing in response to a frequency.
Figure 10:
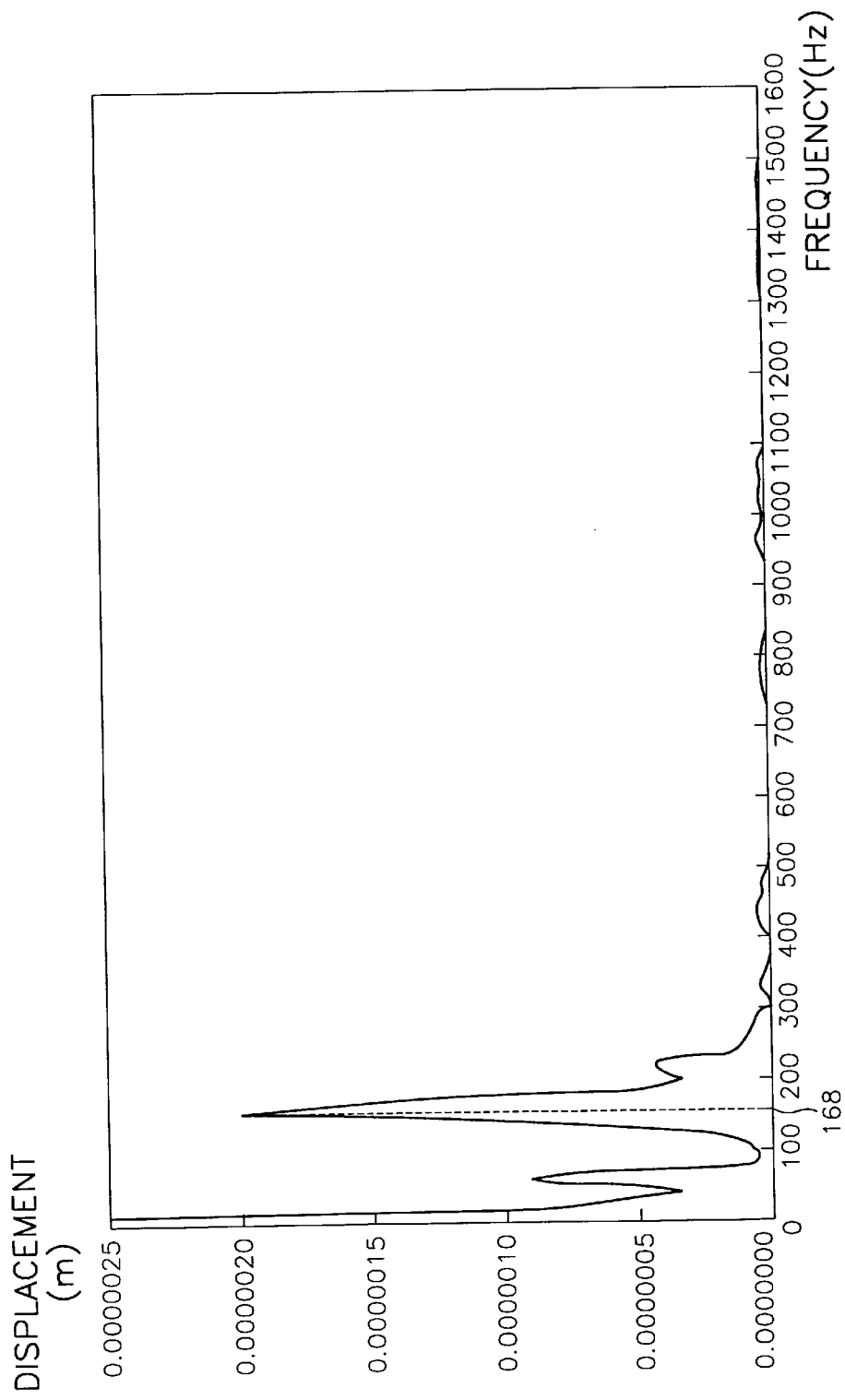
FIG. 10 is a graph showing a displacement evaluated by integrating the acceleration shown in FIG. 9.

FIG. 7 is a perspective view of a front casing 110 having an apparatus for reducing a vibration of a television set in accordance with a second embodiment of the present invention.

Apparatus for reducing a vibration of a television set in accordance with a second embodiment has the same structure as the apparatus 100 of the first embodiment except that it includes a couple of inverse-L-shaped support ribs 150 for reducing the vibration in X direction transmitted to rails 138.

To reduce the vibration in the X direction transmitted to rails 138, the inverse-L-shaped support ribs 150 are integrally formed at undersides of the rails 138, and a width of each support rib 150 is identical to the width of each corresponding rail 138. A thickness T of each support rib is defined by following equation:

$T_1 = t_1 + (t_1 \times 0.3{\sim}0.5)$ mm, wherein $t_1$ is a thickness of each rail.

FIGS. 12 to 15 are graphs for comparing the acceleration in X and Y directions of a couple of rails of the conventional television set and the acceleration in X and Y directions of a couple of rails 138 of the television set having front casing 110 to which the apparatus for reducing a vibration in accordance with the second embodiment of the present invention in response to the frequency.

As is understood from the above graphs, the apparatus for reducing a vibration in accordance with the second embodiment of the present invention can effectively compensate the vibrations produced at rails 138.

Figure 16:
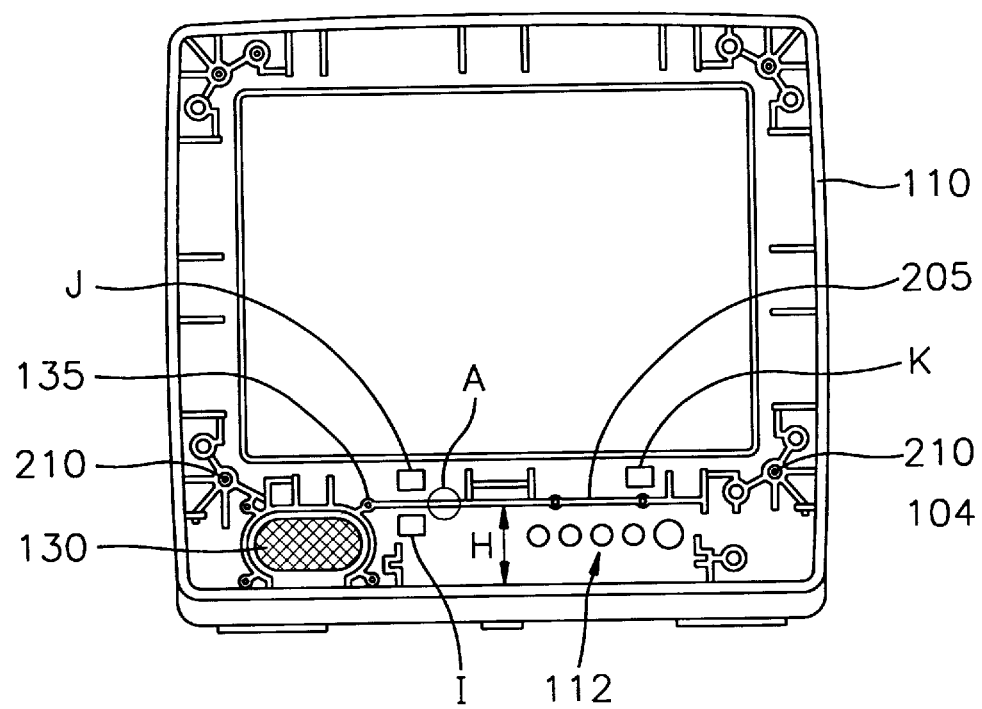
FIG. 16 is a rear view of a front casing having an apparatus for reducing a vibration in accordance with the third embodiment of the present invention.

FIG. 16 is a rear view of a front casing 110 having an apparatus for reducing a vibration in accordance with the third embodiment of the present invention.

The apparatus for reducing a vibration of a television set in accordance with the third embodiment has the same structure as the apparatus 100 of the first embodiment except that it includes a ridge 205 transversely installed over a full width of a rear side of the front casing 110 for reducing a vibration in Z direction.

Preferably, the ridge is transversely installed over a full width of a rear side of the front casing 110 passing through holes 112 formed at the underside of the front casing 110 for inserting the buttons. However, in this case, there may be an interference between the buttons being inserted into holes 112 and ridge 205 when the television set is being assembled. To avoid above problem, as shown in FIG. 16, it is possible to assemble the one end of ridge 205 to a speaker fixing boss 135 and to assemble the other end thereof to a CRT fixing boss 210 connected to a side of front casing 110. In this case, since speaker fixing boss 135 is connected to CRT fixing boss 210 secured to the other side of front casing 110, ridge 205 can effectively compensate the vibration in Z direction of the television set.

The distance H between the bottom part of the front casing 110 and the ridge 205 is defined by following equation:

$H = t_1 \times 1.5{\sim}5$ mm, wherein $t_1$ is a thickness of the front casing.

If the height H of ridge 205 is above the range evaluated by the above equation, ridge 205 may interfere with circuit components installed adjacent to ridge 205. Preferably, the height H is set to a range of 4 to 4.5 mm.

Figure 17:
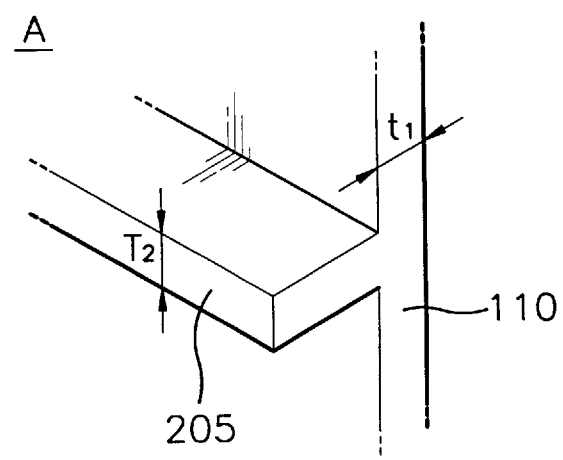
FIG. 17 is an enlarged perspective view of "A" portion shown in FIG. 16.

On the other hand, FIG. 17 is an enlarged perspective view of "A" portion shown in FIG. 16, the thickness $T_2$ of ridge 205 is indicated. The thickness $T_2$ of the ridge is defined by following equation:

$T_2 = t_1 \times 0.3{\sim}0.6$ mm, wherein $t_1$ is a thickness of the front casing.

If thickness $T_2$ of the ridge is above the range, there may be a compression. On the other hand, if thickness $T_2$ of the ridge is below the range, the vibration in the Z direction can be intensely produced.

FIGS. 18 to 20 are graphs for comparing the acceleration in Z direction at first, second and third positions of the front casing of the conventional television set and the acceleration in Z direction at a first, second and third positions I, J, K of the front casing 110 having the apparatus for reducing a vibration in accordance with the third embodiment of the present invention in response to the frequency.

As is understood from the above graphs, by adopting the apparatus for reducing a vibration in accordance with the present invention, the accelerations at the first, second and third positions I, J, K in Z direction enormously decrease. This means that the vibration of the television set in forward and backward directions decreases.

As described above, by installing the apparatus for reducing a vibration in accordance with the present invention, the television set has a resonance frequency within a high frequency band so that the vibration is reduced, thereby reducing a noise and an interference thereof. Also, the apparatus for reducing a vibration in accordance with the present invention can effectively compensate vibrations in X, Y, Z directions, thereby giving a reasonable sound quality.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. An apparatus for reducing a vibration of a television set having a front casing and a speaker installed at a predetermined portion of the front casing, the apparatus comprising;

a mounting plate provided at a bottom part of the front casing and on which a couple of rails for installing a PCB are mounted;

a first means for reducing a vibration of the television set by setting a resonance frequency of the television set to a relatively high frequency; and a second means for reducing a vibration produced on the rails, wherein the rails have F-shaped cross-sections and extend over a full width of the bottom part, the second means includes a couple of inverse L-shaped support ribs integrally formed at undersides of the rails and a couple of support brackets installed at predetermined positions of an underside of the mounting plate corresponding to the rails, and a width of each support rib is identical to a width of each corresponding rail.

2. The apparatus as recited in claim 1, wherein a thickness T of each support rib is defined by a following equation:

$T = t + (t \times 0.3 \sim 0.5)$ mm, wherein t is a thickness of each rail.

3. The apparatus as recited in claim 1, wherein a thickness T of the mounting plate is defined by a following equation:

$T = t + (t \times 0.2 \sim 0.5)$ mm, wherein t is a thickness of the front casing.

4. The apparatus as recited in claim 3, wherein the first means includes a reinforcement strip provided along a circumferential portion of an underside of the mounting plate, a rib group having a cross-shaped pattern which is provided at the underside of the mounting plate in such a manner that the rib group is surrounded by the reinforcement strip, and a couple of support brackets provided in the rib group.

5. The apparatus as recited in claim 4, wherein the reinforcement strip and the rib group are spaced apart from each other by a predetermined interval.

6. The apparatus as recited in claim 4, wherein the thickness of the front casing is in a range of 2.5 to 2.7 mm and thicknesses of the mounting plate and the rib are in a range of 3.3 to 3.7 mm.

7. The apparatus as recited in claim 4, wherein the support brackets have rectangular shapes, and when viewed from a top, each longitudinal axis of each support bracket is identical to each longitudinal axis of each rail.

8. The apparatus as recited in claim 4, wherein each support bracket is provided at a position corresponding to a rear portion of the corresponding rail.

9. The apparatus as recited in claim 4, wherein a height of each support bracket is larger than a height of the reinforcement strip.

10. The apparatus as recited in claim 9, wherein when the television set is placed on a bottom, the support brackets make contact with the bottom so as to support the television set.

11. The apparatus as recited in claim 4, further comprising a third means for preventing the television set from vibrating in a forward or a backward direction.

12. The apparatus as recited in claim 11, wherein the third means includes a ridge transversely installed over a full width of a rear side of the front casing.

13. The apparatus as recited in claim 11, wherein the third means includes a ridge transversely installed over a full width of a rear underside of the front casing, the ridge being disposed adjacent to button holes formed at the front casing.

14. The apparatus as recited in claim 11, wherein a thickness $T_1$ of the ridge is defined by a following equation:

$T_1 = t_1 \times 0.3 \sim 0.6$ mm, wherein $t_1$ is a thickness of the front casing.

15. The apparatus as recited in claim 14, wherein a distance H between the bottom part of the front casing and the ridge is defined by a following equation:

$H = t_1 \times 1.5 \sim 5$ mm, wherein $t_1$ is a thickness of the front casing.

* * * * *